(12) United States Patent
Rose (10) Patent No.: US 7,146,335 B2
(45) Date of Patent: Dec. 5, 2006

(54) ONLINE TRADING SYSTEM HAVING ALLY-INITIATED TRADING

(75) Inventor: Mark Rose, San Jose, CA (US)

(73) Assignee: **E*Trade Group, Inc., A Corp. of California**, Menlo Park, CA (US)

( * ) Notice: Subject to any disclaimer, the term of this patent is extended or adjusted under 35 U.S.C. 154(b) by 897 days.

(21) Appl. No.: 09/809,584

(22) Filed: Mar. 15, 2001

(65) Prior Publication Data

US 2002/0133453 A1    Sep. 19, 2002

(51) Int. Cl.
*G06Q 40/00*    (2006.01)

(52) U.S. Cl. .......................... 705/37; 705/26; 705/35; 715/513; 707/3; 707/10

(58) Field of Classification Search ................. 705/35, 705/37, 26; 715/513; 707/3, 10
See application file for complete search history.

(56) References Cited

U.S. PATENT DOCUMENTS

| | | | |
|---|---|---|---|
| 5,873,071 A | 2/1999 | Ferstenberg et al. .......... 705/37 |
| 6,029,146 A * | 2/2000 | Hawkins et al. .............. 705/35 |
| 6,175,823 B1 * | 1/2001 | Van Dusen ................... 705/26 |
| 6,195,647 B1 * | 2/2001 | Martyn et al. ................. 705/37 |
| 6,226,655 B1 * | 5/2001 | Borman et al. .......... 715/501.1 |
| 6,266,668 B1 * | 7/2001 | Vanderveldt et al. ......... 707/10 |
| 6,317,728 B1 * | 11/2001 | Kane ............................ 705/37 |
| 6,408,282 B1 | 6/2002 | Buist ............................ 705/37 |
| 6,687,745 B1 * | 2/2004 | Franco et al. ............... 709/219 |
| 2001/0003179 A1 | 6/2001 | Martyn et al. ................. 705/37 |
| 2001/0044771 A1 | 11/2001 | Usher et al. ................... 705/37 |
| 2002/0091615 A1 | 7/2002 | Salvani ......................... 705/37 |
| 2002/0091616 A1 | 7/2002 | Buist ............................ 705/37 |

OTHER PUBLICATIONS

Mutual fund Newsletter, Apr. 1, 2000.*
Mutual Funds India Website pages (www.mutualfundsindia.com) 7 pages.*
Datek Webpages total of 23 sheets, 1996 and 1997.*
Greg Govatos, "Speed up your dynamic Web content", Network World. Framingham: Dec. 18, 2000.vol. 17, Iss. 51; p. 43, 1 pgs (total 3 pages).*
Miller Freeman Inc., "Tips, tricks, and automated helpers", Keyboard. San Francisco: Apr. 2000vol. 26, Iss. 4; p. 20, 1 pgs (total 2 pages).*
Datek Webpages (p. 84/109 of 100/109 and 103-104/109 and 106/109), 1997 webpages.*

* cited by examiner

*Primary Examiner*—Hyung Sough
*Assistant Examiner*—Harish T. Dass
(74) *Attorney, Agent, or Firm*—Conley Rose, P.C.

(57) ABSTRACT

An online system for trading securities is disclosed. The system may include an investor computer, a brokerage computer, and a third party computer, all coupled together by a network. The third party computer responds to investment information requests from the investor computer by providing HTML documents having the desired investment information and a link. The link is a URL address of order software on the brokerage computer, and it includes an indicator of a specific security associated with the investment information. Examples of such securities include stocks, a mutual funds, and options. The link is preferably implemented as a button icon labeled "Trade Now". When the third party computer is an investment research service, the existence of the Trade Now icon greatly expedites the investor's ordering process by directly retrieving an order form with appropriate fields pre-populated. The investor may be required to enter a password.

25 Claims, 6 Drawing Sheets

ONLINE TRADING SYSTEM HAVING ALLY-INITIATED TRADING

BACKGROUND

1. Field of the Invention

The present invention relates generally to systems and methods for providing online services. More particularly, the present invention relates to a system for online trading that allows third party services to include links for expedited trading.

2. Description of Related Art

The stock market allows individuals to buy and sell ownership interests in publicly traded corporations. Such ownership interests may be traded through trading of shares of company stock, trading of options on a stock, and/or trading of holding companies or mutual funds that own a portion of the company. Generally, such ownership interests are herein termed "securities".

The advent of online trading has made it convenient for individual investors to participate in the stock market, and consumer response to the availability of online trading has been phenomenal. In 1999 alone, the number of online brokerage accounts grew by over 100%, so that by the end of 1999 there were well over 10 million online brokerage accounts. The increased number of investors and increased trading volume has encouraged many brokerages to compete for market share by reducing trading costs. Of course, brokerages can only handle greater volumes at reduced costs by improving the efficiency of their processes.

One of the brokerage processes that would benefit from increased efficiency is trading order placement. The traditional process requires interested account holders to (1) enter the URL of the online brokerage; (2) select a logon icon; (3) enter their username and password; (4) click a submit icon; (5) select a trade icon; (6) enter the stock symbol; (7) enter the other order details including price, order type, etc.; (8) click a preview icon; and (9) click a submit icon. Such a series of actions is tedious and cumbersome. Furthermore, if the account holder leaves the brokerage site, the process must be repeated for any subsequent orders.

The traditional process virtually guarantees that certain particularly desirable customers, namely day traders, will find the online brokerage unsuitable to their needs. This process places a heavy burden on such investors because they perform numerous trades each day, and they constantly move between the brokerage and various research and monitoring sites. Accordingly an improved trading system would be desirable.

SUMMARY OF THE INVENTION

The problems outlined above are at least in part addressed by a system for trading securities online. In a preferred embodiment, the system comprises a network that couples together an investor computer, a brokerage computer, and a third party computer. The third party computer responds to investment information requests from the investor computer by providing HTML (hyper-text markup language) documents having the desired investment information and a link. The link is a URL (uniform resource locator) address of order software on the brokerage computer, and it includes an indicator of a specific security associated with the investment information. Examples of such specific securities include a particular company's stock, a particular mutual fund, and a particular stock option. The link is preferably implemented as a button icon labeled "Trade Now". When the third party computer is an investment research service, the existence of the Trade Now icon greatly expedites the investor's ordering process by directly retrieving an order form onto the investor computer with appropriate fields pre-populated. The investor may be required to specify details to complete the order form and may be required to enter a password.

BRIEF DESCRIPTION OF THE DRAWINGS

For a more detailed description of the preferred embodiment of the present invention, reference will now be made to the accompanying drawings, wherein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 1A:
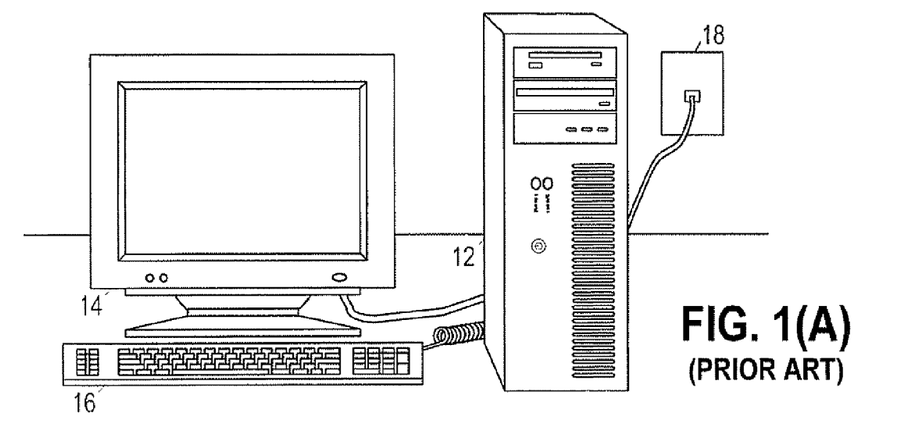
FIG. 1A shows a prior art personal computer.

Turning now to the figures, FIG. 1A shows an exemplary computer system that a person can use to run software and access information on the Internet. A user can interact with the computer system via the user input device 16 and the output device 14 that are coupled to the computer 12. The computer 12 executes software stored internally or received from digital information communication media 18. Of course many variations exist for each of these components, and the particular configuration shown is not intended to exclude other configurations that are known in the art.

Figure 1B:
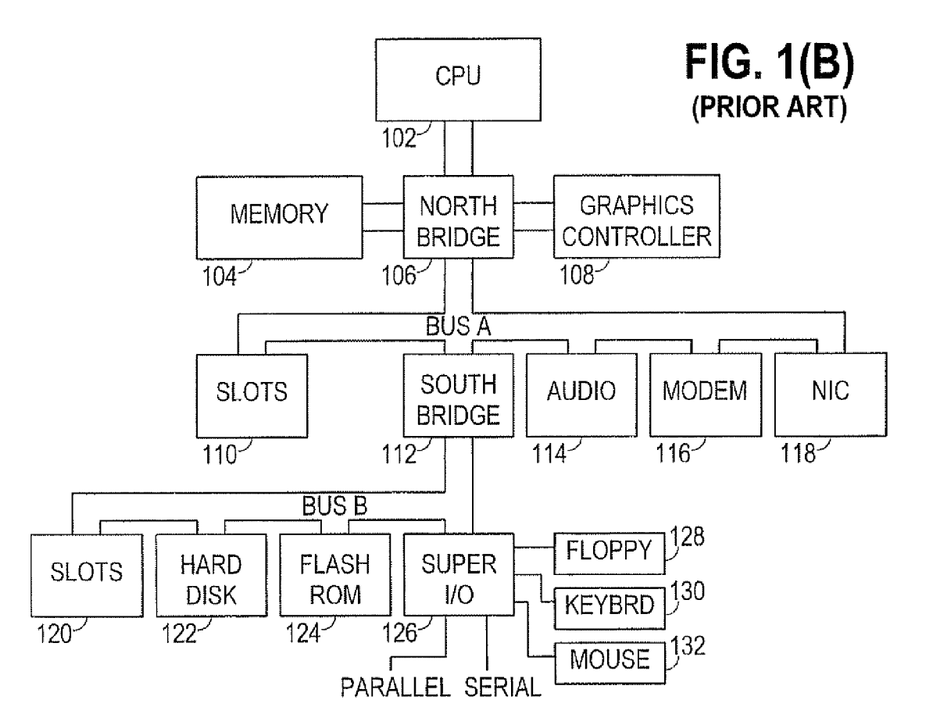
FIG. 1B shows a representative block diagram of a personal computer.

FIG. 1B shows an exemplary configuration of a representative prior art computer 12. Computer 12 includes a CPU 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an accelerated graphics port (AGP) bus. The North bridge 106 couples CPU 102, memory 104, and graphics controller 108 to the other peripheral devices in the system through a primary expansion bus (BUS A) such as a PCI bus or an EISA bus. Various components that comply with the bus protocol of BUS A may reside on this bus, such as an audio device 114, a modem 116, and a network interface card (NIC) 118. These components may be integrated onto the motherboard, or they may be plugged into expansion slots 110 that are connected to BUS A. As technology evolves and higher-performance systems are increasingly sought, there is a greater tendency to integrate many of the devices into the motherboard which were previously separate plug-in components.

If other secondary expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location with respect to the North bridge 106 in a typical computer system drawing. Various components that comply with the bus protocol of BUS B may reside on this bus, such as hard disk controller 122, Flash ROM 124, and Super I/O controller 126. Slots 120 may also be provided for plug-in components that comply with the protocol of BUS B. The Super I/O controller 126 typically interfaces to basic input/output devices such as a keyboard 130, a mouse 132, a floppy disk drive 128, a parallel port, a serial port, and sometimes various other input switches such as a power switch and a suspend switch.

Figure 1C:
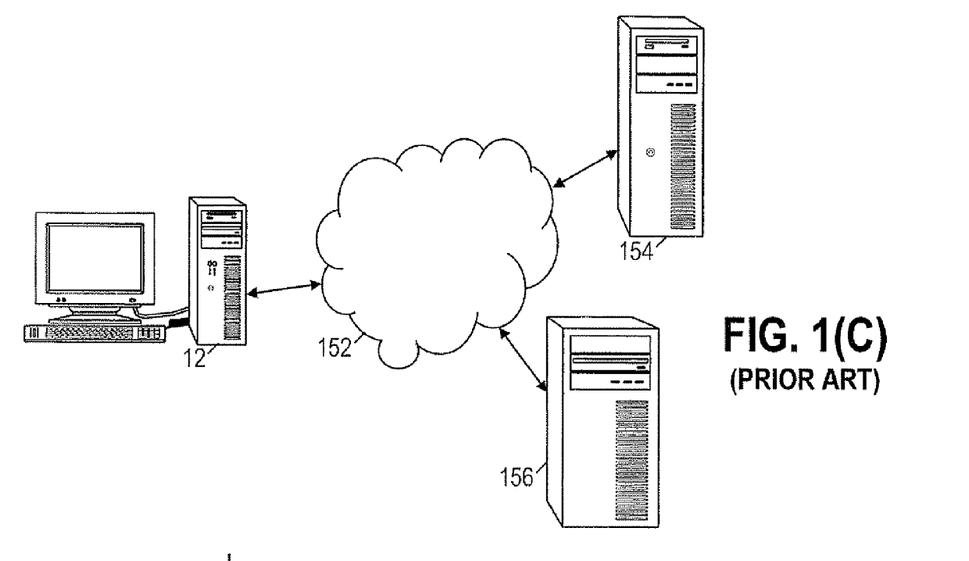
FIG. 1C illustrates a prior art computer network.

Computer 12 may be coupled to a network or to the Internet via modem 116 or NIC 118. FIG. 1C shows an exemplary network 152 that couples computer 12 to other computers 154, 156. When coupled to the network 152, the user of computer 12 can access information stored on other computers. One way for a user to do this is to execute web-based software (e.g., a "browser") on computer 12.

Browser software is normally stored on internal long-term storage media such as hard disk 122 (FIG. 1B). When the user initiates execution of the software, the processor 102 loads the software into memory 104, and then accesses individual instructions from the software as needed for execution. The browser normally includes a graphical user interface (GUI) that graphically presents the user with a set of options on output device 14 (FIG. 1A), determines which, if any, of the available options that the user selects via input device 16, and responsively presents a new set of options in accordance with the user's selection.

Conventional browsers present the user options in the form of a web page. The browser can retrieve the web page from computer 12 or from other computers coupled to the network. Web pages are typically written in hyper-text markup language (HTML), a programming language that allows programmers to present options in the form of "links" from graphics or textual items within a page to other pages having new options in similar form. Some web pages include embedded software "applets" that the browsers can execute to accept text input, perform calculations, animate objects on the screen, and/or send information to other computers.

Thus the user of computer 12 can access information and services provided by others on other computers coupled to network 152 (FIG. 1C). One such service is online trading. In FIG. 1C, assume one or more of the computers (say 156) is an online brokerage web server, that is, a computer that provides access to a set of stored web pages that provide an interface to the online brokerage. Another one or more of the computers (say 154) is a web server of some ally which provides its own services, e.g. research for financial markets.

The above description illustrates the interaction of the hardware involved in an example of an online system. However, the hardware configuration is merely the backdrop for the implementation of the online trading system. To the user, and indeed, to the research service and brokerage, the hardware configuration is invisible. A wide variety of hardware configurations may be used to achieve essentially the same results. Each of the tasks may be distributed across several computers or congregated onto one.

Figure 2:
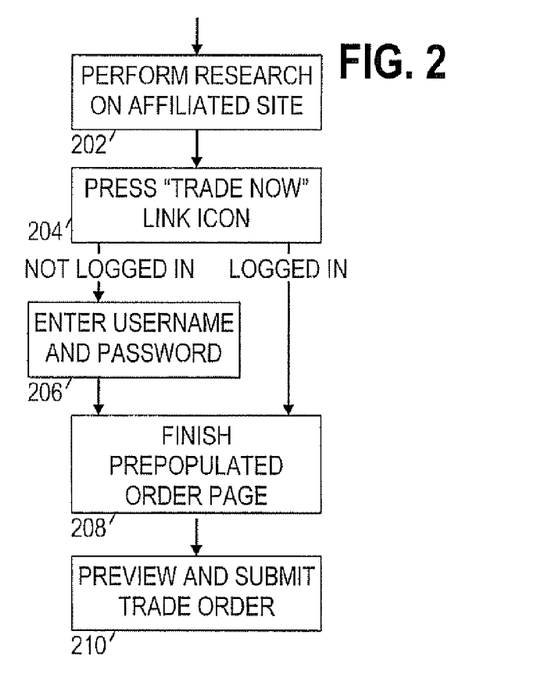
FIG. 2 shows an ally-initiated trading process from a user's point of view.
Figure 3:
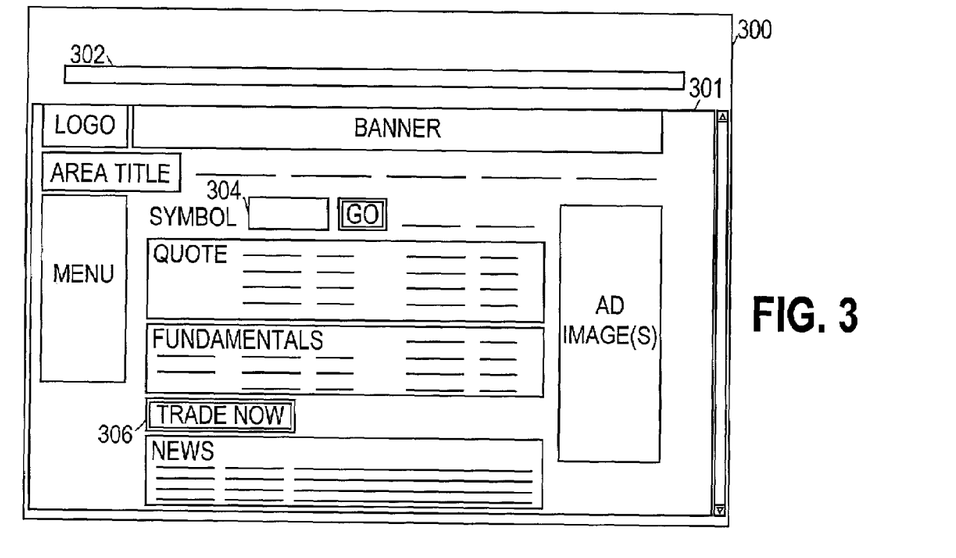
FIG. 3 illustrates a research page of an ally.

Referring now to FIG. 2, in block 202 a user wishing to invest money in the securities launches a web browser on computer 12, and accesses various web pages on web server 154 to do some research and identify an investment opportunity. FIG. 3 shows an example of what a typical browser could present on output device 14 (FIG. 1A). The browser's graphical user interface 300 may include a display window 301, and a uniform resource locator (URL) entry box 302. The display window 301 shows a web page. By default, the URL entry box 302 shows the URL address of the web page being shown in window 301. However, the browser allows a user to enter a new URL address in box 302, and after the user presses the "Enter" key, the browser will attempt to retrieve a web page from a server having the specified address to display in window 301.

In FIG. 3, the display window 301 shows a web page for a specified stock that might typically be provided by a research service. It may include a logo identifying the research service, an advertising banner, a title identifying the area of the research site being accessed, a menu of user options, and various other advertising images. Typically, a stock symbol entry field 304 is provided in which a user can type a stock symbol to retrieve the available research information on the corresponding stock. The user may have to press a "GO" button or its equivalent to cause computer 12 to request the information from server 154. The server 154 typically provides quote information, fundamental information, and news. The quote information may include such items as opening price, daily high, daily low, 52 week high, 52 week low, current bid, current ask, last trade price, previous close price, price change relative to the previous close, and daily trading volume. The fundamentals may include such items as price-to-earnings ratio, earnings per share, dividends per share, dividend yield, market capitalization, number of shares, the trading exchange, debt load, return on investment, etc. The news generally includes a list of titles of recent articles and press releases that refer to the company. Typically, the user can view the news item by clicking the corresponding title.

In the preferred embodiment, the research service also provides a "Trade Now" button, link, icon, or its equivalent. The Trade Now button preferably appears in multiple locations on the research site, including any charts, portfolios, news items, and quote pages. Once the user has identified an investment opportunity (or other occasion to act, such as a threat of a loss), the user actuates the Trade Now item. This is represented by block 204 in FIG. 2. The very first time a user actuates the Trade Now item, the server 154 may provide a configuration page to computer 12 to configure the operation of the Trade Now item. Because this is a one-time only operation, it is not shown in FIG. 2.

Figure 4:
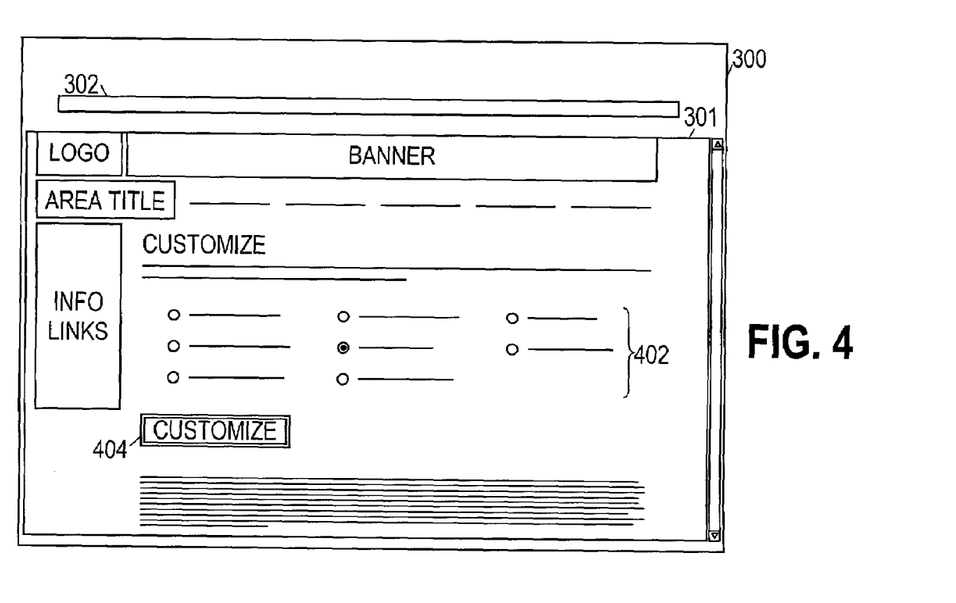
FIG. 4 illustrates a trading link customization page of an ally.

An example of such a configuration page is shown in FIG. 4. It includes a list 402 of online brokerages with corresponding radio buttons. The user selects the radio button corresponding to the brokerage that the user wishes to associate with the Trade Now item. Once the user selects a brokerage and actuates the Customize button 404, the user is forwarded to the selected brokerage. Thereafter, a user actuating the Trade Now icon at the research site will be directed straight to the selected brokerage site as shown in FIG. 2.

The user's access to brokerage server 154 is preferably divided into sessions. The user preferably initiates a session by accessing a login page such as that shown in FIG. 5, entering a username and password, and actuating a "Log On" button 510. The session terminates when the user actuates a "Log Out" button, or when a predetermined time has elapsed since the user's last communication with the brokerage server 154.

Figure 5:
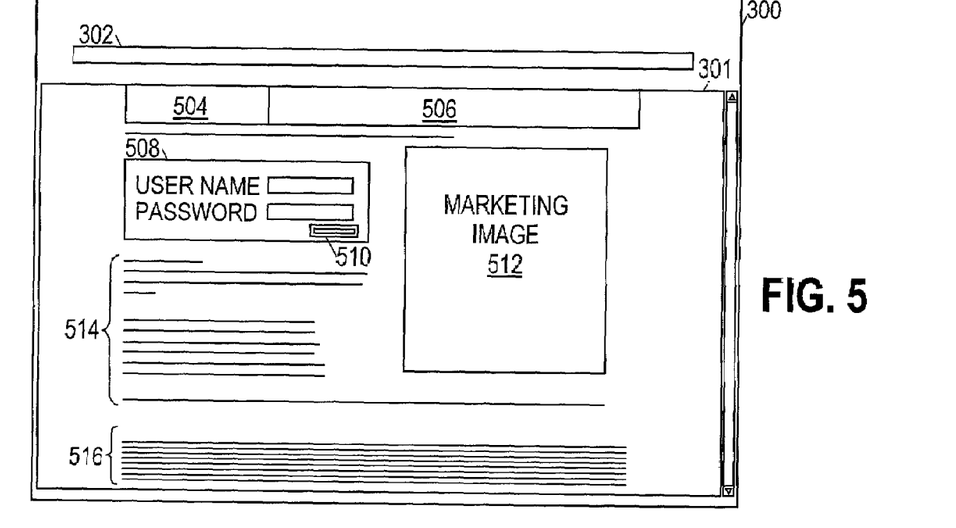
FIG. 5 shows a brokerage login page.

The login page may include a logo 504 that identifies the brokerage site, a brand identifier 506 that identifies the research service, a login block 508, a Log On button 510, a marketing image 512, descriptive text 514, and fine print 516. The login block includes entry fields for a username and password, and preferably includes the Log On button 510. The marketing image 512 preferably provides an eye-catching advertisement for one or more of the services offered by the brokerage. Image 512 may include links to open an account for those users not having an account with this brokerage. Descriptive text 514 preferably describes the brokerage service, and fine print 516 preferably provides any desirable legal disclaimers. These legal disclaimers may be customized for each ally, and preferably clarify the relationship (or lack thereof) between the ally and the brokerage. This may be particularly desirable in light of federal regulations and securities rules regulating activities between brokers and securities dealers.

While the session is active (i.e. after initiation and before termination), the user preferably is allowed to direct his browser back to the research site or to other web sites. Actuation of a "Trade Now" item while the session is still active preferably allows the user to bypass the login page and takes the user to the next page. As indicated in FIG. 2, the next page is also provided when the user successfully logs in.

Depending on the context of the "Trade Now" item, the next page is preferably an order page for a stock trade, a mutual fund trade, or an option trade. In particular, if the "Trade Now" item was located on a quote page for a stock, the next page is preferably a stock order form. If the "Trade Now" item was located on a quote page for an option, the next page is preferably an option order form. The same applies to mutual funds. Each of these order form pages is described in turn with reference to FIGS. 6–8.

Figure 6:
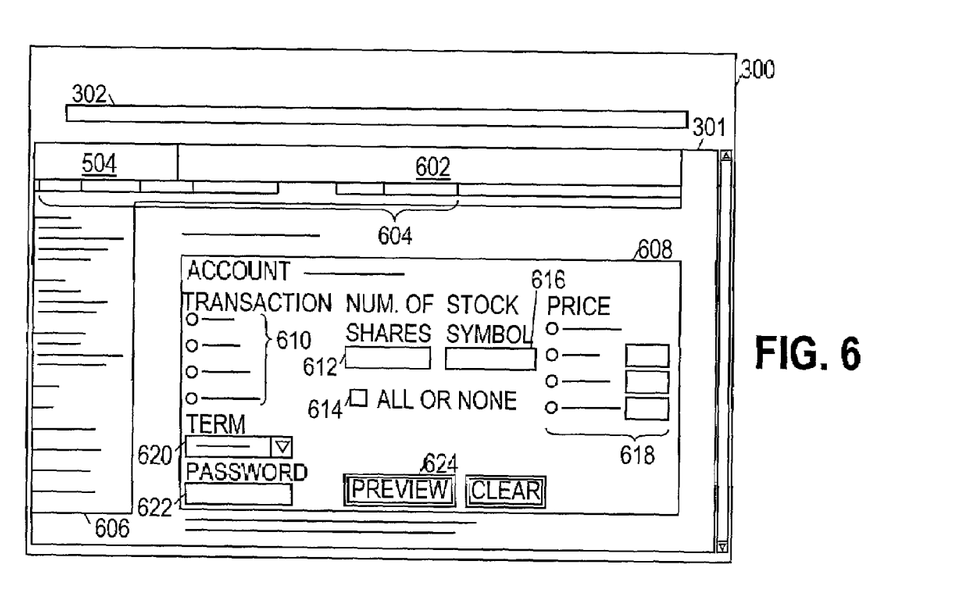
FIG. 6 shows a stock order entry page.

FIG. 6 shows an example of a stock trade order page. It may include a site utility menu 602, a series of account "tabs" 604, a trading menu 606, and an order form 608. The site utility menu 602 may include such items as a "Log Out" button, a "Help" link, a "Site Map" link, and an entry field for requesting quotes on equities. The account tabs 604 may each be associated with a different aspect of the user's account. The tabs may include a "Home" tab, a "Portfolio" tab, a "Market" tab, a "Research" tab, a "Trading" tab, a "Banking" tab, and an "Account Services" tab. Selecting a tab causes computer 12 to display an associated menu for that portion of the user account. The trading tab, for example, is associated with trading menu 606. Trading menu 606 may include, e.g., such options as "Enter Stock Order", "Enter Options Order", "Enter Mutual Fund Order", "View Open Orders", "Bonds", "IPOs", "Trading History", "Transfer Funds".

Order form 608 is a stock order form such as might be presented if the user had first selected the "Trading" tab and then selected the "Enter Stock Order" menu option. Advantageously, the user's actuation of the "Trade Now" item on the research site has bypassed the need for such actions by the user. Preferably, various fields of the order form are populated with default values determined by the context of the "Trade Now" item. If the Trade Now item was on a quote page for a specific stock, the stock symbol entry field preferably shows the stock symbol of that stock as a default value.

The order form 608 typically includes such items as a transaction type selection buttons 610, a number of shares entry field 612, an all-or-none indicator 614, a stock symbol entry field 616, a price type and price entry fields 618, an order term list box 620, a trading password entry field 622, and a preview button 624. The transaction type selection buttons 610 may be labeled "Buy", "Sell", "Sell Short", "Buy to Cover". The price types may be "Market", "Limit", "Stop", "Stop Limit". An entry field is provided for each of the last types for the user to enter the desired price. The available terms may be "Good for Day" or "Good until Canceled".

After completing the order form, the user enters a password in entry field 622, and actuates Preview button 624. If the password is valid, this causes the computer to display the order for the user's review, along with a "Submit" button and a "Cancel" button. The user then submits the order if the order appears correct, and the brokerage will attempt to fill the trade order in the normal course of business.

Figure 7:
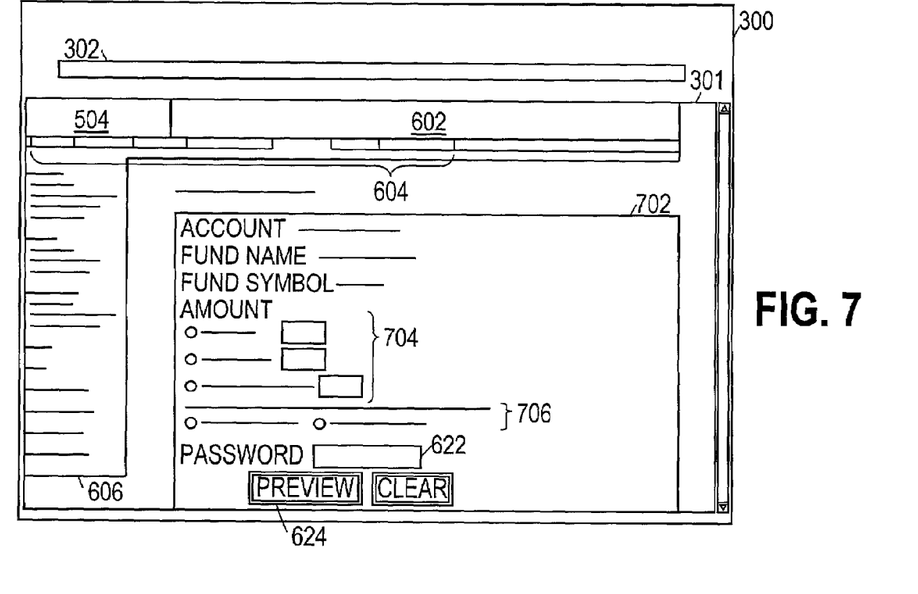
FIG. 7 shows a mutual fund order entry page.

FIG. 7 shows a mutual fund order form 702. The mutual fund order form typically displays the fund name and symbol, a selection of amount types and values 704, a reinvestment option 706, the password entry field 622, and the preview button 624. The amount types may include "Dollars", "Shares", "Dollars but no fractional shares". Each amount types is provided with a corresponding entry field for entering the amount of dollars or number of shares the user wishes to exchange.

Figure 8:
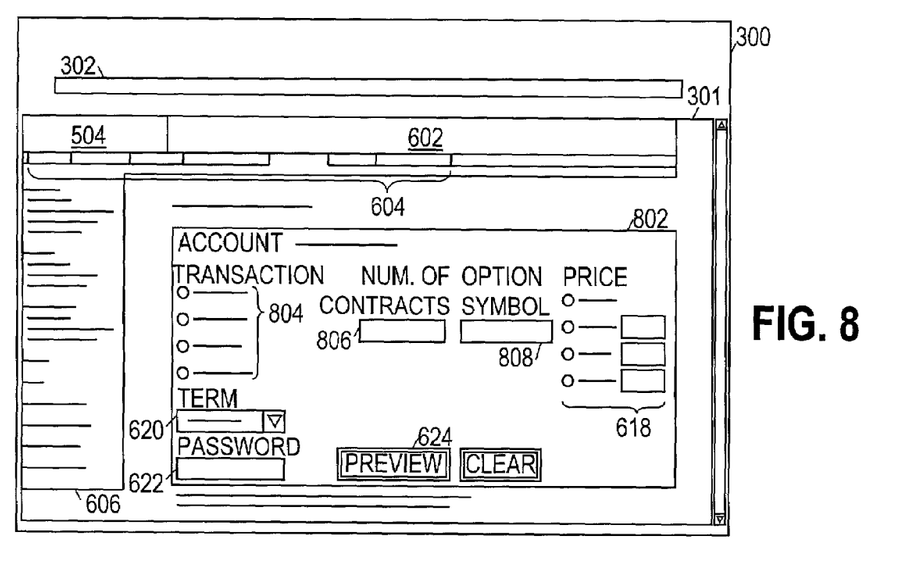
FIG. 8 shows an option order entry page.

FIG. 8 shows an option order form 802. It may include a transaction type 804, a number of contracts entry field 806, an option symbol entry field 808, a price type and price entry fields 618, an order term list box 620, a password entry field 622, and a preview button 624. The transaction types may include "Buy Open", "Sell Open", "Buy Close", and "Sell Close". Options are sold in contracts each representing 100 shares, so the user is provided an entry field for number of contracts rather than number of shares. The option symbol typically represents the stock being traded, the type of option (call or put), and the strike price of the option. The entry field 808 is preferably populated with a default value when possible.

Returning to FIG. 2, the user completes the order form in block 208, and previews and submits the order in block 210. The user may then return to the research site to continue looking for other investment opportunities.

Figure 9:
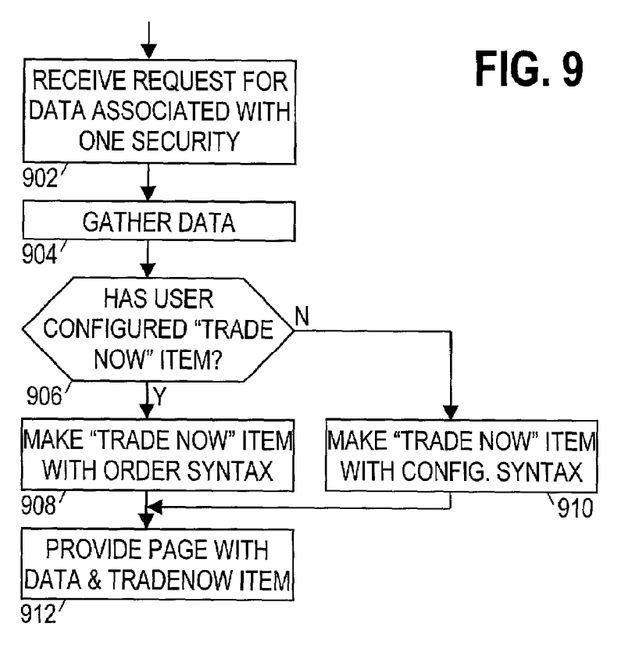
FIG. 9 shows the ally-initiated trading process from an ally's point of view.

The process used by web server 154 is shown in FIG. 9. In block 902, the server 154 receives a request from computer 12 for data associated with a security. Examples of this could be a stock quote, a press release, and a mutual fund prospectus. In block 904 the server gathers the requested data. In block 906, the server determines if the user has configured the Trade Now item. If the user has configured the item, the server creates the trade now item using an order syntax in block 908. Otherwise, the server creates the trade now item using a configuration syntax in block 910. Finally, the server sends a page having the data and the trade now item to computer 12.

The configuration syntax may simply be a link to the configuration page shown in FIG. 4. The order syntax is preferably a link to the user's brokerage site along with some additional parameters. It may be as follows:

<URL>+<Routine>[?<Parameter Name>=<Value> [&<Parameter Name>=<Value>] . . . ]

In this preferred form, the root portion of the link is a URL (uniform resource locator address) to an application on the brokerage web server 152. It is followed by an indication of the application software routine that is responsible for preparing web pages of the desired type. That is followed by an optional list of parameters. Each parameter is provided in the form of Parameter Name=Value, and the parameters are separated by an "&" symbol. The order of the parameters is preferably unimportant.

The URL is preferably constant for a given brokerage. In a preferred embodiment, the URL has a standard prefix ("https:") that is followed by the server name ("//trading.e-trade.com"), which is in turn followed by an indication of the application software "/cgi-bin/gx.cgi/AppLogic". However, one of skill in the art will recognize that the URL may be adapted to the particular brokerage services needs. In the preferred embodiment, the software routine for options and stock trading is "TradeMain", while the software routine for mutual funds trading is "MFBuy2".

As mentioned previously, the parameters are optional, and their order is variable. However, the parameters may be used to reduce the effort required by the user. To that end, the research service preferably provides as many parameters as possible. For Mutual Funds trading, the valid parameters preferably include: SOURCE, LPAGE, BUY. The source parameter is preferably set equal to a unique identifier of the research service page. It may be used for market tracking, so that an analysis may be done of traffic patterns. An example of a unique identifier for a Yahoo chart page might be "yhch231d". Any arbitrary unique identifier may be used. The identifier may alternatively identify a specific "Trade Now" button on the ally's web site. Such an identifier might be "bitmrd002". The Lpage parameter is preferably set to a unique identifier for the research service, e.g. "Yahoo". It is used to select a co-branded login page when the user needs to log in. As shown in FIG. 5, the login page is co-branded because it includes an identifiers of both the brokerage and the research service. The source and Lpage parameter values are preferably provided to the ally by the brokerage.

The buy parameter is preferably set equal to the symbol for the mutual fund. Accordingly, on a chart page for the Janus Overseas Fund (symbol: JAOSX), the link for the Trade Now item would preferably be the foregoing URL followed by "+MFBuy2?BUY=JAOSX&LPAGE=Yahoo& SOURCE=yhch231d". Generally, links are not allowed to include white space such as spaces, tabs, or carriage returns. The example links above may include white space in print for formatting reasons and to disable them in electronically published documents. Also, URLs are typically case-insensitive. However, in a preferred embodiment, the parameter names and parameter values are treated as case sensitive by the software routine.

When the ally-initiated trade relates to a mutual find, the preferred embodiment enforces a presumption that the user will be buying, rather than selling, the mutual fund. This is believed advantageous because owners of mutual funds generally do not make mutual fund "sell" decisions based on research at third party sites. Rather, such decisions are believed to be primarily the product of personal financial needs.

For stock trading, the valid parameters preferably include: SOURCE, LPAGE, SYMBOL, TXN. The source and Lpage parameters are the same as before, and the SYMBOL parameter here is preferably the same as the mutual fund BUY parameter. The TXN parameter preferably is set equal to one of the following values: "stockform" or "optionform". These values respectively cause the order form for stock trades and the order form for option trades to be provided to the user. Accordingly, on a quote page for Dallas Semiconductor Put options with a strike price of 35 and an expiration in March (Symbol: DSOG.X), the Trade Now item would preferably be foregoing URL followed by "+TradeMain?LPAGE=Yahoo&SOURCE=yhqo0154& SYMBOL=DSOG.X&TXN=optionform". In both this and the previous example, the order form's entry field for the security symbol will be filled with the security symbol provided by the link.

Figure 10:
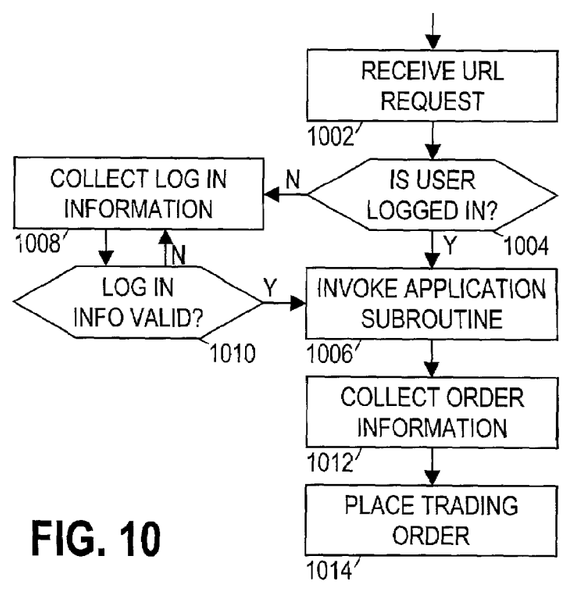
FIG. 10 shows the ally-initiated trading process from the brokerage's point of view.

FIG. 10 shows a preferred embodiment of the process implemented by the brokerage. In block 1002 the server 154 receives the Trade Now URL request. In block 1004, the server 154 determines if the user has an active session in progress. This determination may be done by requesting a "cookie" from computer 12, and if a cookie is provided, examining the cookie to verify that it is valid and has not expired. The cookie preferably also indicates the user name or account number. If the user has an active session going, then in block 1006, the server 154 invokes the software routine specified by the URL, and provides the routine the parameters included in the URL. If no active session is going, then the server 154 requests log in information from the user, using a log in page such as that shown in FIG. 5. In block 1010, the server 154 determines if the log in information is valid, and if so, invokes the software routine in block 1006. The server 154 may also transmit a cookie to computer 12 indicating the initiation of a session. If the log in information is invalid, an error message is provided, and the user is given another opportunity in block 1008.

If the parameters provided to the software routine are those indicated herein, the routine should be able to provide the appropriate order form to computer 12 with a securities symbol provided in the appropriate field. In block 1012, the server 154 collects the rest of the required order information and presents it to the user for final approval. Once the user approves the order, the server 154 in block 1014 places the trading order into the normal stream of business.

In various places throughout the above discussion, repeated mention has been made of research sites and allies. It is noted that this language has been used for explanatory purposes and is not limiting. The URL (link) for opening up an order form from the brokerage site may potentially be provided by any third party site having an agreement with the brokerage.

In addition, only three specific examples of securities have been mentioned in the above description. The scope of the present invention is limited only by the language of the claims, and as such, may include securities trading of any kind. By way of example, and without limitation, other securities that may be included are: bonds, securities auctions, initial public offerings, commodities, futures, and currencies.

Numerous variations and modifications will become apparent to those skilled in the art once the above disclosure is fully appreciated. It is intended that the following claims be interpreted to embrace all such variations and modifications.

What is claimed is:

1. A method for trading securities, wherein the method comprises:
    retrieving from a service provider information regarding a specific security, wherein the information includes a representation of a link to an online brokerage service;
    actuating the representation, thereby retrieving an order form for the specific security from the online brokerage service;

completing the order form; and submitting the order form to the brokerage service;

wherein the order form includes a field to indicate the specific security, and wherein the brokerage service populates the field with a symbol indicating the specific security before providing the order form.

2. The method of claim 1, wherein the specific security is a particular company's stock.

3. The method of claim 1, wherein the specific security is a particular mutual fund.

4. The method of claim 1, wherein the specific security is a particular option.

5. The method of claim 1, wherein the service provider provides an investment research service.

6. The method of claim 1, wherein the information includes one or more price quotes for the specific security.

7. The method of claim 1, wherein the information includes recent news about the specific security.

8. The method of claim 1, wherein the representation is a button icon.

9. The method of claim 1, wherein the representation is a button icon with a "Trade Now" label.

10. The method of claim 1, wherein the link includes a root portion, a software routine indicator portion, and a parameter portion.

11. The method of claim 10, wherein when the specific security is a mutual fund, the software routine indicator indicates a first software routine that generates a mutual fund purchase order form, and wherein when the specific security is a stock or stock option, the software routine indicator indicates a second, different software routine that generates stock and stock option order forms.

12. The method of claim 10, wherein the parameter portion includes a source parameter indicative of the service provider, and a securities parameter indicative of the specific security.

13. The method of claim 12, wherein the parameter portion further includes a transaction parameter indicative of a security type to which the specific security belongs.

14. The method of claim 1, wherein said completing includes entering a password into a corresponding entry field in the order form.

15. A system for trading securities, wherein the system comprises:

a network, an investor computer coupled to the network;

a brokerage computer coupled to the network; and a third party computer coupled to the network, wherein the third party computer is configured to respond to investment information requests from the investor computer by providing HTML (hyper-text markup language) documents having the investment information and a representation of a link, wherein the link is a URL (uniform resource locator) address of order software on the brokerage computer, and wherein the link includes an indicator of a specific security associated with the investment information;

wherein the brokerage computer is configured to respond to a request activated by said link by sending an HTML document to the investor computer, wherein HTML document is a securities order form that indicates the specific security associated with the investment information.

16. The system of claim 15, wherein the specific security is a particular company's stock.

17. The system of claim 15, wherein the specific security is a particular mutual fund.

18. The system of claim 15, wherein the specific security is a particular stock option.

19. The system of claim 15, wherein the third party computer implements an investment research service.

20. The system of claim 15, wherein the representation is a button icon with a "Trade Now" label.

21. The system of claim 15, wherein the link includes a root portion, a software routine indicator portion, and a parameter portion.

22. The system of claim 21, wherein when the specific security is a mutual fund, the software routine indicator indicates a first software routine that generates a mutual fund purchase order form, and wherein when the specific security is a stock or stock option, the software routine indicator indicates a second, different software routine that generates stock and stock option order forms.

23. The system of claim 21, wherein the parameter portion includes a source parameter indicative of the service provider, and a securities parameter indicative of the specific security.

24. The system of claim 23, wherein the parameter portion further includes a transaction parameter indicative of a security type to which the specific security belongs.

25. The system of claim 15, wherein the order form includes a password entry field.

* * * * *